United States Patent
Taylor

(10) Patent No.: US 6,903,279 B2
(45) Date of Patent: Jun. 7, 2005

(54) GUIDE TROUGHS FOR WEIGHING BUCKETS AND CHUTES

(75) Inventor: Alfred A. Taylor, Lugarno (AU)

(73) Assignee: TNA Australia Pty Limited, Lidcombe (AU)

(*) Notice: Subject to any disclaimer, the term of this patent is extended or adjusted under 35 U.S.C. 154(b) by 146 days.

(21) Appl. No.: 10/371,165

(22) Filed: Feb. 19, 2003

(65) Prior Publication Data

US 2003/0209367 A1 Nov. 13, 2003

(30) Foreign Application Priority Data

Feb. 19, 2002 (AU) .............................................. PS0617

(51) Int. Cl.$^7$ ............................................. G01G 19/387
(52) U.S. Cl. ..................... 177/25.18; 193/2 R; 198/532
(58) Field of Search ................ 177/25.18; 193/2 R; 198/532, 541, 546

(56) References Cited

U.S. PATENT DOCUMENTS

| 4,478,300 A | * | 10/1984 | Mikami ....................... 177/59 |
| 4,683,966 A | | 8/1987 | Nakagawa et al. ...... 177/25.18 |
| 5,117,878 A | | 6/1992 | Shaw et al. .................. 141/333 |
| 5,613,590 A | | 3/1997 | Simionato .................... 198/358 |
| 5,765,655 A | * | 6/1998 | Tatsuoka .................. 177/25.18 |
| 6,338,606 B1 | | 1/2002 | Bierschenk et al. ..... 414/788.2 |
| 6,409,461 B1 | | 6/2002 | Bierschenk et al. ..... 414/788.2 |
| 6,605,785 B1 | * | 8/2003 | Muramiya ............... 177/25.18 |

FOREIGN PATENT DOCUMENTS

| EP | 0307188 A2 | 3/1989 |
| EP | 0723140 A1 | 7/1996 |
| EP | 0747679 A2 | 12/1996 |
| EP | 1164365 A | 12/2001 |

* cited by examiner

Primary Examiner—Randy W. Gibson
(74) Attorney, Agent, or Firm—Townsend and Townsend and Crew LLP

(57) ABSTRACT

A weigher for a packaging machine has buckets that deliver product batches. Each bucket includes a pair of spaced side walls between which a bottom extends, and over which the product passes. A bottom wall has at least one trough to control the trajectory of the product leaving the bucket to minimize angular velocity of the product about the vertical axis of a chute. The chute has a substantially vertical axis and receives the batches of product from the weighing buckets. The chute has a side wall converging downwardly from an upper opening to a lower opening, and an internal surface over which the product passes.

3 Claims, 3 Drawing Sheets

GUIDE TROUGHS FOR WEIGHING BUCKETS AND CHUTES

TECHNICAL FIELD

The present invention relates to packaging machines and particularly to the product delivery services extending between a weigher and a former of a packaging apparatus.

BACKGROUND OF THE INVENTION

Packaging apparatus includes a weigher that delivers discreet batches of product to a chute extending to a former. The former receives stripped bag material and forms the bag material into a tubular configuration. The product is delivered to the interior of the tubular bag material, with the tube bag material being subsequently longitudinally and transversely sealed and cut to form discreet packages.

The surfaces over which the product passes between the weigher and former include the internal surfaces of the weigher buckets, a weigher chute and a further chute extending between the lower end of the weigher chute and the former.

In the operation of the above-discussed weighing and packaging apparatus, product "dumped" from the weighing buckets falls past the weigher chute and then past the next chute. Both these chutes converge downwardly so that should the product have any angular velocity when it exits the bucket or subsequently gains angular velocity (about the longitudinal axis of the chutes), that angular velocity will increase due to the converging sides of those chutes. Any product that has an angular velocity will have an increased travel time with respect to reaching the former. This angular velocity may also result in product damage due to impact with either the chutes and/or adjacent product.

SUMMARY OF THE INVENTION

It is an object of the present invention to overcome or substantially ameliorate the above disadvantages.

There is disclosed herein a weigher bucket for a weigher of a packaging machine that delivers product to a chute having a vertical axis, the bucket including a pair of spaced side walls between which a bottom wall extends, and over which the product passes, the bottom wall having at least one trough to control the trajectory of the product leaving the bucket to minimize angular velocity of the product about the vertical axis of the chute.

There is further disclosed herein a chute, having a substantially vertical axis, for a packaging apparatus, the chute being adapted to receive batches of product from weighing buckets, and wherein the chute has a side wall that surrounds the axis and that converges downwardly from an upper opening to a lower opening, and an internal surface over which the product passes, with the internal surface providing a plurality of radially and axially downwardly extending troughs which engage the product to inhibit angular movement thereof about the axis.

There is also disclosed herein, in combination:

a weigher for a packaging machine, the weigher having buckets that deliver product batches, each bucket including a pair of spaced side walls between which a bottom extends, and over which the product passes, the bottom wall having at least one trough to control the trajectory of the product leaving the bucket to minimize angular velocity of the product about the vertical axis of the chute; and a chute having a substantially vertical axis and that receives the batches of product from the weighing buckets, and wherein the chute has a side wall converging downwardly from an upper opening to a lower opening, and an internal surface over which the product passes.

Preferably, the internal surface has a plurality of radially and axially downwardly extending troughs that engage the batches of product.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
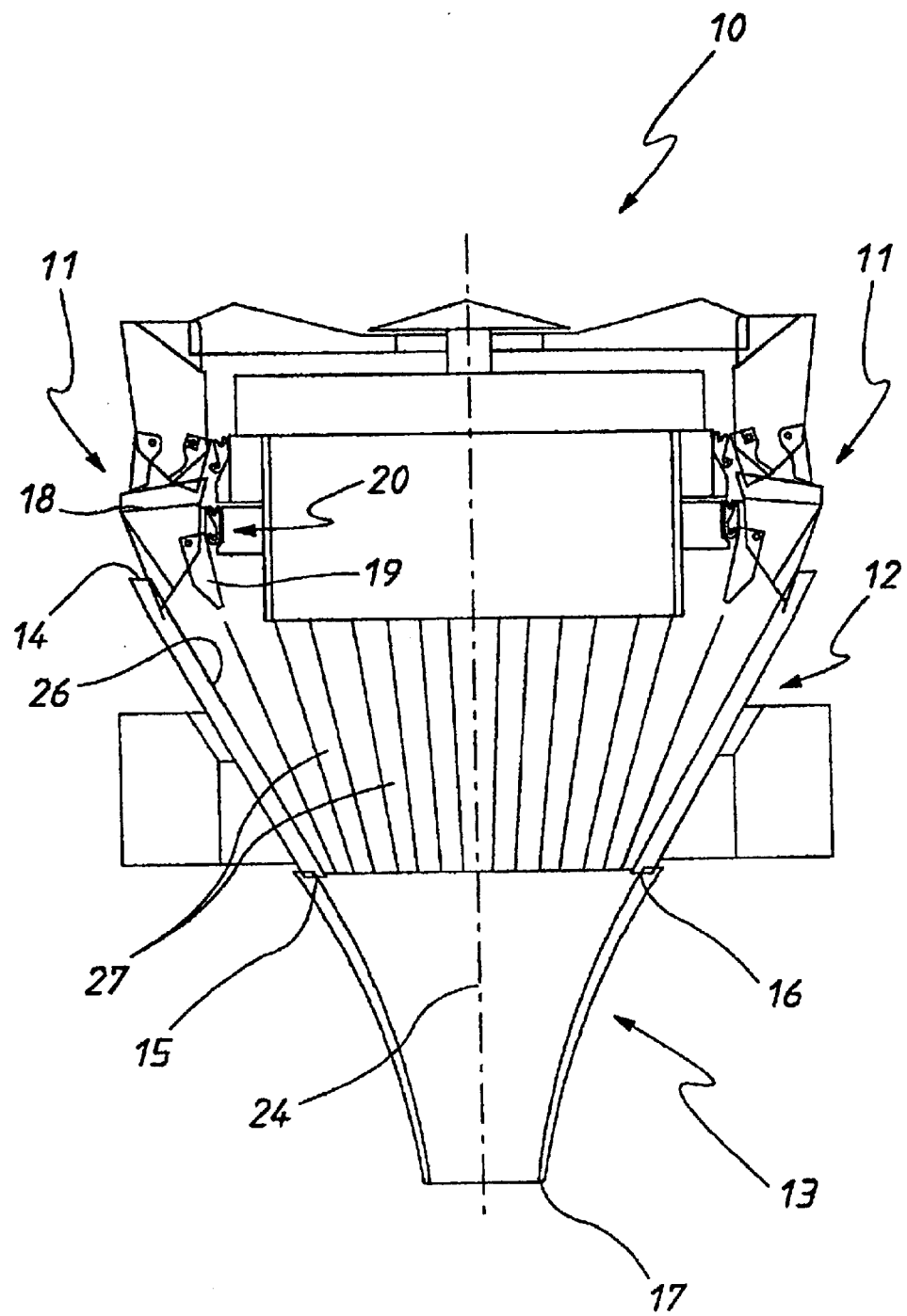
FIG. 1 is schematic part section side elevation of a weigher and associated chutes of a packaging machine.
Figure 2:
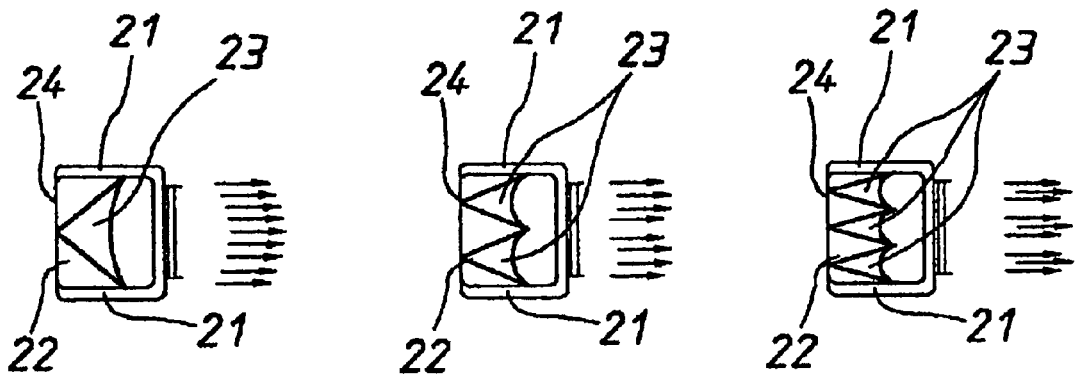
FIG. 2 is a schematic top plan view of a series of modifications to buckets employed in the weigher of FIG. 1.
Figure 3:
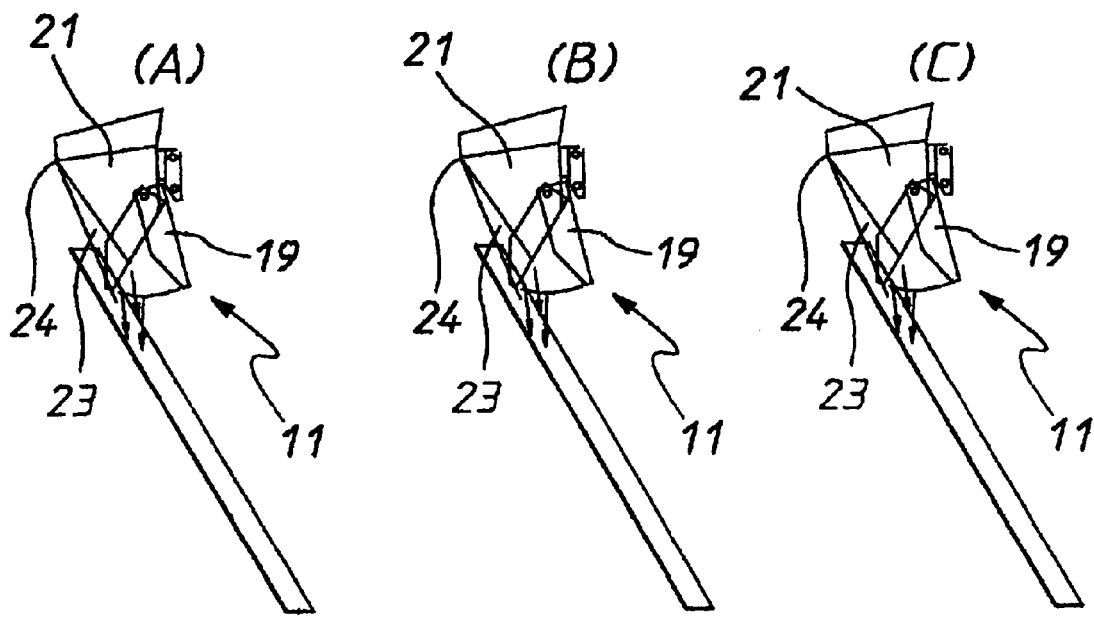
FIG. 3 is a series of schematic side elevations of a weighing bucket and portion of an associated chute.

In the accompanying drawings, there is schematically depicted a weigher 10. The weigher 10 has a plurality of weighing buckets 11 that weigh batches of product and deliver the batches to an upper chute 12. The upper chute 12 in turn delivers the weighed batches of product to a lower chute 13 that would be located above a former of a packaging machine. The product is delivered to the interior of tubular bag material, with the tubular bag material being longitudinally and transversely sealed, and transversely cut to form discreet bags of the product. The chute 12 is frusto-conical in configuration and has an upper edge 14 and a lower edge 15. The chute 13 is of parabolic configuration and has an upper edge 16 and a lower edge 17.

Each of the buckets 11 includes a fixed portion 18 with which there is associated a movable bucket door 19. The bucket doors 19 are pivotally mounted and are moved by actuators 20 between an open position and a closed position relative to the fixed portion 18. When a required weight of product is contained within the bucket 11, the bucket door 19 is opened to release the batch of product for delivery to a packaging machine located below the former. Typically, the doors 19 would be opened in sequence so as to be in phase with the operation of the packaging machine.

Each bucket 11 includes a pair of spaced upwardly extending side walls 21 between which there extends a bottom wall 22. The bottom wall 22 has one or more troughs 23 which engage the product so as to inhibit angular movement thereof above the vertical axis 24. That is, the troughs 23 engage the product to control the trajectory of the product to eliminate or at least minimize any angular velocity of the product above the vertical axis 24.

Each of the troughs 23 tapers from a maximum width adjacent the lower edge of the fixed portion 18 to a minimum width adjacent the upper linear edge 24 of the fixed portion 18. In this embodiment, each of the troughs 23 increases in depth from the rear edge 24.

Figure 4:
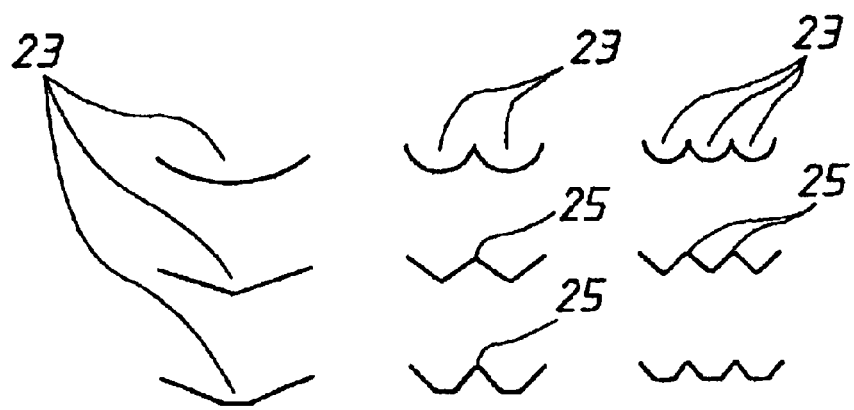
FIG. 4 is a schematic end elevation of a series of profiles that may be employed in the chutes and buckets of FIGS. 2 and 3.
Figure 5:
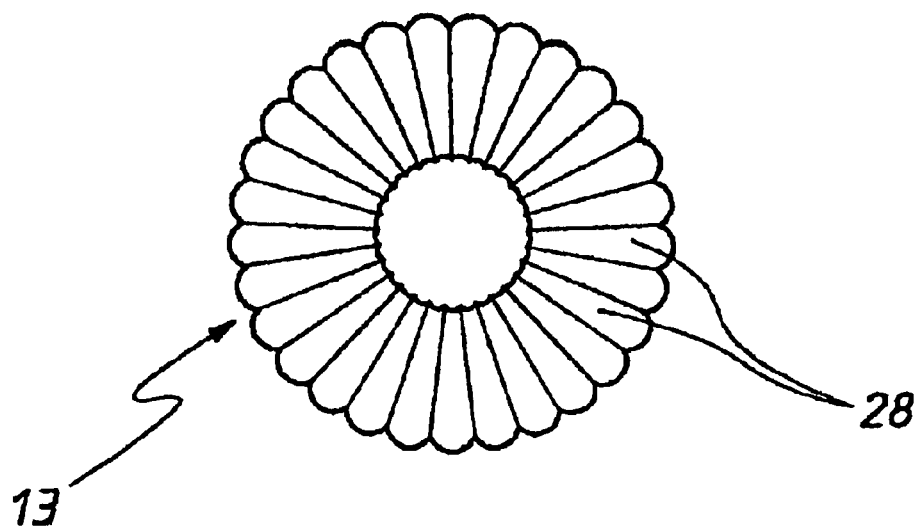
FIG. 5 is a schematic top plan view of a chute of FIG. 1.
Figure 6:
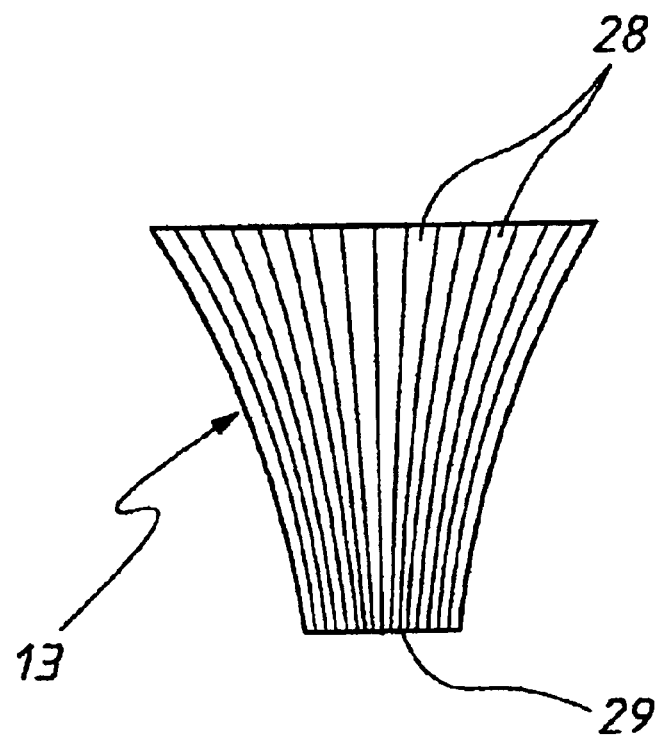
FIG. 6 is a schematic section of the side elevation of the chute of FIG. 5.

The troughs 23 may be of an arcuate configuration, "V" configuration or a "W" configuration or other configurations as shown in FIG. 4. Still further, individual troughs 23 may be spaced by means of ridges 25.

The chute 12 has an internal surface 26 provided with a plurality of downwardly extending troughs 27, which in this embodiment are aligned with the troughs 23. The troughs 27 do not have an angular direction of extension; that is, they do not extend angularly about the axis 24 and therefore prevent or at least inhibit the batches of product having any angular velocity above the axis 24. Accordingly, the troughs 27 are radially and axially extending. The troughs 27 therefore control the trajectory of the batches of product passing the chute 13. Again, the troughs 27 may be arcuate, "V" in transverse cross-section or include a plurality of ridges.

The chute 13 has a plurality of downwardly extending troughs 28 which are aligned with the troughs 27. Again, the troughs 28 do not have an angular direction of extension about the axis 24 and therefore direct the product towards the lower opening 29 so as to eliminate or at least inhibit the product having any angular velocity about the axis 24. Accordingly, the troughs 27 are radially and axially extending. Preferably, the troughs 23 are aligned with the troughs 27 that are in turn aligned with the troughs 28.

It is also preferable for the troughs 27 to be aligned with the troughs 28 on the opposite side of the axis 24 so that should product travel across the interior of the chute 13, the product will engage a trough 28 on the opposite side to thereby again inhibit angular movement of the product.

The claims defining the invention are as follows:

1. A weigher bucket for a weigher of a packaging machine that delivers product to a chute having a vertical axis, said bucket including a pair of spaced side walls between which a bottom wall extends, and over which the product passes, said bottom wall having at least one trough to control the trajectory of the product leaving the bucket to minimize angular velocity of the product about the vertical axis of the chute.

2. In combination:

a weigher for a packaging machine, the weigher having buckets that deliver product batches, each bucket including a pair of spaced side walls between which a bottom extends, and over which the product passes, said bottom wall having at least one trough to control the trajectory of the product leaving the bucket to minimize angular velocity of the product about the vertical axis of the chute; and a chute having a substantially vertical axis and that receives the batches of product from the weighing buckets, and wherein said chute has a side wall converging downwardly from an upper opening to a lower opening, and an internal surface over which the product passes.

3. The combination of claim 2 wherein said internal surface has a plurality of radially and axially downwardly extending troughs that engage the batches of product.

* * * * *